United States Patent [19]

Krawczyk et al.

[11] Patent Number: 5,236,134
[45] Date of Patent: Aug. 17, 1993

[54] METHOD OF RECLAIMING GLASS FROM ARTICLES FORMED OF LEADED GLASS

[75] Inventors: Robert J. Krawczyk, Endicott; James F. Matthews, Binghamton; Louis J. Norman, Kirkwood, all of

[73] Assignee: Envirocycle Incorporated, Vestal, N.Y.

[21] Appl. No.: 788,036

[22] Filed: Nov. 5, 1991

[51] Int. Cl.$^5$ .............................................. B02C 23/36
[52] U.S. Cl. ...................................... 241/21; 241/99; 51/316
[58] Field of Search ............... 241/21, 16, 99; 51/313, 51/316; 134/10, 25.1, 26, 29, 33; 156/665, 663, 656; 252/79.5

[56] References Cited

U.S. PATENT DOCUMENTS

| | | | |
|---|---|---|---|
| 4,110,085 | 8/1878 | Balz | 51/313 X |
| 4,165,396 | 8/1979 | Calamari, Jr. | 139/29 X |
| 4,607,798 | 8/1986 | Odlin | 241/99 |
| 4,858,833 | 8/1989 | Hanulik | 241/24 |
| 4,938,840 | 7/1990 | Schachter | 134/33 X |
| 5,106,598 | 4/1992 | Cogar | 241/99 X |

FOREIGN PATENT DOCUMENTS

| | | | |
|---|---|---|---|
| 248198 | 12/1987 | European Pat. Off. | 241/99 |
| 1299544 | 3/1987 | U.S.S.R. | 241/99 |

Primary Examiner—Mark Rosenbaum
Assistant Examiner—Frances Chin
Attorney, Agent, or Firm—Shenier & O'Connor

[57] ABSTRACT

A method of recovering leaded glass from leaded glass articles such as cathode ray tubes having evaporated aluminum thereon and coatings of phosphors and sodium silicate-containing material, as well as plastic labels and adhesives and other organic films in which the articles are broken into pieces and tumbled in a diphase solution, one phase of which is a solution of an alkaline earth in water and the other phase of which is an organic solvent for a period of time sufficient to remove all coatings and materials from the glass pieces which are then ready for melting and formation of new articles.

18 Claims, 1 Drawing Sheet

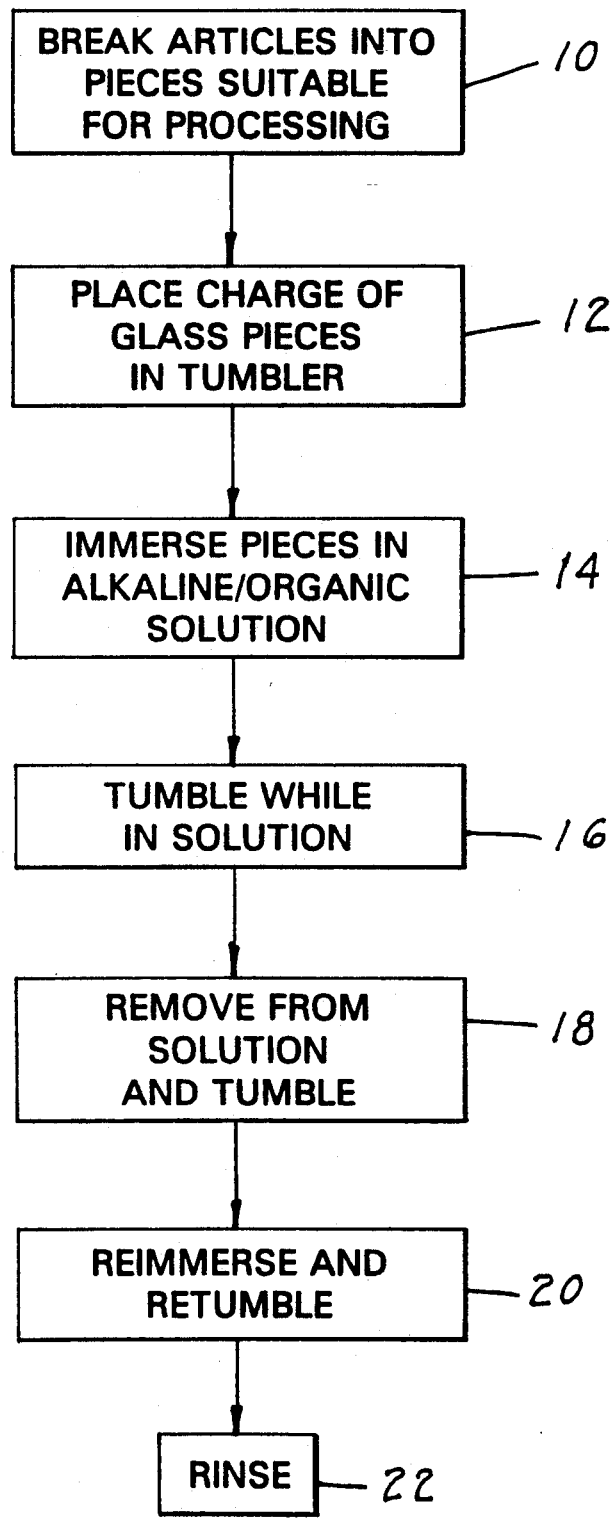

METHOD OF RECLAIMING GLASS FROM ARTICLES FORMED OF LEADED GLASS

FIELD OF THE INVENTION

The invention is in the field of reclaiming glass and, more specifically, relates to a method of reclaiming glass from articles formed of leaded glass.

BACKGROUND OF THE INVENTION

There are known in the prior art many objects such as cathode ray tubes, computer monitors, television tubes and the like which are formed from leaded glass. Such articles cannot be disposed of in sanitary land fill since they release lead into the environment under mildly acid conditions.

It is desirable that the leaded glass of which the articles mentioned hereinabove are formed be reclaimed for remelting and use in the manufacture of new articles. Articles such as cathode ray tubes contain evaporated aluminum, phosphors containing rare earths and cadmium sulfides and Aquadag which is a carbon/sodium silicate or iron oxide/sodium silicate coating. In addition, such articles have labels adhered to the surface thereof by suitable adhesives, iron anode buttons and cathode guns. All of these materials must be removed from the glass before it is suitable for reprocessing.

Attempts have been made in the prior art to recover leaded glass from articles such as cathode ray tubes and the like by acid processing to clean the articles of contaminants. Such processing, however, results in dissolving some lead and the highly toxic phosphors which in most instances contain cadmium and rare earth compounds. In addition, hydrogen disulfide is liberated when the acid contacts the phosphors. It will readily be appreciated that processing of this nature results in the release of pollutants and requires special waste treatment.

SUMMARY OF THE INVENTION

One object of our invention is to provide a method for reclaiming leaded glass which overcomes the defects of methods of the prior art.

Another object of our invention is to provide a leaded glass recovery method which does not result in the release of any pollutants.

A further object of our invention is to provide a leaded glass recovery method which does not require special waste treatment.

Yet another object of our invention is to provide a leaded glass recovery method which facilitates the recovery of saleable by-products.

Still another object of our invention is to provide a leaded glass recovery method which is easy to practice.

A still further object of our invention is to provide a leaded glass recovery method which is economical.

Other and further objects of our invention will appear from the following description.

BRIEF DESCRIPTION OF THE DRAWING

In the accompanying drawing to which reference is made in the instant specification and which is to read in conjunction therewith, the figure is a block diagram illustrating the steps in our process.

DESCRIPTION OF THE PREFERRED EMBODIMENT

Referring now to the Figure, in the first step of our process indicated by the block 10, the articles from which the leaded glass is to be reclaimed first are broken into pieces of a size suitable for processing. This may be accomplished in any suitable manner. For example, the articles may be passed through a rotating cylindrical crusher which reduces the glass to pieces of a size suitable for the subsequent treatment. We have found that three to four inch pieces of glass can effectively be treated in the course of our process.

In the next step of our process indicated by the block 12, a charge of the broken glass is placed in a tumbling apparatus. By way of example, a suitable apparatus would be a five gallon capacity cylindrical plastic container which is perforated to admit the treating solution to be described hereinbelow. An electric motor was connected to the drum through a belt drive to rotate the drum. In order to assist in the mixing and tumbling operation during barrel rotation, wooden cleats were fixed to the inner surface of the barrel. It will readily be understood that any suitable tumbling apparatus can be employed in the practice of our process.

In the practice of the step indicated by the block 12, the tumbling barrel is filled to approximately 25% of its capacity with broken glass resulting from the step indicated by the block 10. This glass is in an "as received" condition in which the usual labels, tape residue, Aquadag, aluminum, phosphors, anode buttons and the like are present.

After the charge of broken glass has been placed in the tumbling barrel, the barrel is lowered relative to a tank containing our tumbling solution until the glass pieces were immersed in the solution, as indicated by the block 14.

Preferably we employ a diphase solution made up of an alkaline solution and an organic component. The concentration of the alkaline solution must be sufficient to etch aluminum, keep metallic salts insoluble and prevent liberation of hydrogen disulfide. We have discovered that solutions of 5% to 50% by weight of sodium hydroxide meet these requirements. Rather than using sodium hydroxide we may use potassium hydroxide or another hydroxide having the required concentration.

The organic component of the solution is an organic solvent capable of removing organic films such as plastic labels, organic adhesives used to adhere the labels to the article, and other plastic or resin films or coatings which are used in the manufacture and use of articles such as cathode ray tubes. We have discovered that suitable organic components are polyalcohols or polyethers. Carbitol, which is the registered trademark of Union Carbide Corporation for a family of mono and dialkyl ethers of diethylene glycol is suitable for use in the process.

As indicated by block 16 in the drawing, while the charge of broken glass is immersed in the diphase solution, the drum is rotated to tumble the pieces. This tumbling results in an abrasive action of the pieces of glass on each other to assist in removal of material and cleaning of the glass.

While we have found that in most cases the abrasive action of the glass pieces on each other, together with the action of the components of the solution, is sufficient for effective cleaning, under certain circumstances it may be found desirable to add an abrasive medium to the solution to improve the speed of material removal. Suitable abrasive materials would be stone and sand. Sand or stone or a mixture of both can be used depending upon the fineness which is desired. It is usually added to the drum or tumbler in a quanitity which is approximately one-half the volume of the glass pieces. Optimum hardness of the abrasive medium appears to be 3.5 or greater on the mho hardness scale. Rather than using sand, we might employ "Black Beauty" abrasive which is a non-corrosive abrasive composed of oxides of iron, aluminum, calcium, magnesium, titanium and silicon in a form resembling glass. The size of the stone which is used should be such as would not pass through the perforations in the tumbling drum.

In one specific test of our process we carried out the tumbling step corresponding to block 16 of the drawings for 30 minutes in a 120° Fahrenheit diphase solution of soidum hydroxide and butyl carbitol. The solution was 5% by weight of sodium hydroxide, 15% by volume of butyl carbitol with the balance water.

After the tumbling step just described, the tumbling drum was withdrawn from the solution and the moist charge was tumbled for an additional 30 minutes without rinsing as indicated by block 18. After this moist tumbling, the charge was again immersed in the same diphase solution at 120° F. and tumbled for another 30 minutes, as indicated by block 20.

After the second immersed tumbling step, the drum is withdrawn from the solution and the charge is rinsed as indicated by block 22. This is achieved by immersing the cylinder in water and rotating it while immersed. In practice we have found the optimum result to be produced by rinsing the charge twice for about two-and-a-half minutes per rinse cycle. The result is a complete cleaning of the glass from all of the contaminants and labels and the like noted hereinabove.

Not only does our method result in complete cleaning of the glass pieces but also it permits of the recovery of certain materials. For example, the undissolved phosphors are readily separated for reuse by standard gravimetric waste treatment techniques, thus eliminating any environmental hazard. The aluminum hydroxide formed in the process also is readily recovered and can be separated for resale.

Following the rinsing operation, the glass is ready for remelting and reuse in the manufacture of new leaded glass articles.

It will readily be appreciated that the times for which the various tumbling operations are carried out can vary within relatively wide ranges depending upon the material being treated. Further, if the articles from which the glass is being recovered do not carry any labels or if the labels are removed beforehand, it may not be necessary to incorporate the organic phase in the solution and yet produce glass which is ready for melting.

It will be seen that we have accomplished the objects of our invention. We have provided a method for recovering glass from articles formed of metal glass. Our method effectively removes labels, aluminum evaporated film, aquadag coatings, phosphor and any residual resins and other materials present from articles such as cathode ray tubes and the like, leaving clean leaded glass pieces which are suitable for melting for the manufacture of new articles of leaded glass. Our process does not dissolve lead or the toxic phosphors and no hydrogen disulfide is liberated from the phosphors. Our method permits ready separation and recovery for reuse of undissolved phosphors and aluminum hydoxide.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A method of recovering leaded glass from leaded glass articles having evaporated aluminum thereon and coatings of phosphors and sodium silicate-containing material comprising the steps of
   breaking said articles into pieces of a size suitable for processing,
   immersing said pieces in an alkaline solution of such a strength as to etch aluminum while keeping metallic salts insoluble and preventing liberation of hydrogen disulfide,
   tumbling said pieces by whirling them in a rotating tumbling barrel while immersed in said solution for a length of time sufficient to form aluminum hydroxide from said aluminum and to remove said phosphors and said sodium silicate-containing material from said pieces and
   rinsing said pieces to produce pieces which are sufficiently clean for remelting.

2. A method as in claim 1 in which said tumbling step includes the steps of tumbling said pieces while immersed in said solution for a first period of time, removing said pieces from said solution and tumbling said pieces for a second period of time and reimmersing said pieces and tumbling the pieces while reimmersed for a third period of time.

3. A method as in claim 2 in which said immersing step comprises immersing said pieces in an alkaline solution having a concentration of between five and fifty percent by weight of an alkaline earth hydroxide.

4. A method as in claim 3 in which said hydroxide is sodium hydroxide.

5. A method as in claim 2 in which each of said periods of time is approximately thirty minutes.

6. A method as in claim 1 in which said immersing and tumbling steps comprise placing a charge of said pieces in a perforated cylindrical container, said charge being about twenty-five percent of the volume of said container, at least partially immersing said container in said solution and rotating said container.

7. A method as in claim 1 in which said immersing step comprises immersing said pieces in a solution which includes an abrasive medium.

8. A method of recovering leaded glass from leaded glass articles having evaporated aluminum thereon and coatings of phosphors and sodium-silicate-containing material as well as plastic labels and adhesives and other organic films comprising the steps of
   breaking said articles into pieces of a size suitable for processing,
   immersing said pieces in a diphase solution comprising an alkaline phase of such a strength as to etch aluminum while keeping metallic salts insoluble and preventing liberation of hydrogen disulfide and an organic phase made up of an organic solvent, tumbling said pieces by whirling them in a rotating barrel while immersed in said solution for a length of time sufficient to form aluminum hydroxide from said aluminum and to remove said phosphors and said sodium silicate-containing material and said plastic labels and adhesives and organic films from said pieces, and rinsing said pieces to produce pieces which are sufficiently clean for remelting.

9. A method as in claim 8 in which said immersing step comprises immersing said pieces in a diphase solution having an alkaline phase of a concentration of between five and fifty percent by weight of an alkaline earth hydroxide in water.

10. A method as in claim 8 in which said immersing step comprises immersing said pieces in a diphase solution having an organic phase made up of an alkyl ether of diethylene glycol.

11. A method as in claim 10 in which said organic phase is about fifteen percent by volume of said diphase solution.

12. A method as in claim 8 in which said immersing step comprises immersing said pieces in a diphase solution having an alkaline phase of a concentration of between five and fifty percent by weight of an alkaline earth hydroxide in water and in which said organic solvent is about fifteen percent by volume of said diphase solution.

13. A method as in claim 12 in which said tumbling step includes the steps of tumbling said pieces while immersed in said solution for a first period of time, removing said pieces from said solution and tumbling said pieces for a second period of time and reimmersing said pieces and tumbling said pieces while reimmersed for a third period of time.

14. A method as in claim 13 in which each of said periods of time is approximately thirty minutes.

15. A method as in claim 12 in which said immersing step comprises immersing said pieces in a diphase solution at a temperature of about 120 degrees F.

16. A method as in claim 12 in which said immersing step comprises immersing said pieces in a diphase solution containing an abrasive medium.

17. In a method of reclaiming leaded glass, the step of tumbling broken pieces of leaded glass by whirling them in a rotating tumbling barrel while immersed in a solution of an alkaline earth.

18. In a method as in claim 17 in which said tumbling step comprises tumbling said pieces while immersed in a diphase solution, one phase of which is said alkaline earth solution and the other phase of which is an organic solvent.

* * * * *